US008541051B2

(12) United States Patent
Saini et al.

(10) Patent No.: US 8,541,051 B2
(45) Date of Patent: *Sep. 24, 2013

(54) ON-THE FLY COATING OF ACID-RELEASING DEGRADABLE MATERIAL ONTO A PARTICULATE

(75) Inventors: Rajesh K. Saini, Duncan, OK (US); Bradley L. Todd, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 1726 days.

This patent is subject to a terminal disclaimer.

(21) Appl. No.: 10/736,339

(22) Filed: Dec. 15, 2003

(65) Prior Publication Data
US 2005/0034861 A1    Feb. 17, 2005

Related U.S. Application Data

(63) Continuation-in-part of application No. 10/641,242, filed on Aug. 14, 2003, now Pat. No. 7,080,688.

(51) Int. Cl.
*B05D 7/00* (2006.01)
*E21B 43/16* (2006.01)

(52) U.S. Cl.
USPC ............ 427/212; 427/215; 166/278; 166/307

(58) Field of Classification Search
USPC .................... 427/212, 215; 166/278, 307
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,836,465 A | 9/1974 | Rhudy et al. | |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A * | 6/1976 | Free et al. | 507/216 |
| 3,968,840 A | 7/1976 | Tate | 166/280.1 |
| 3,986,355 A | 10/1976 | Klaeger | |
| 3,998,272 A | 12/1976 | Maly | 166/281 |
| 3,998,744 A | 12/1976 | Arnold et al. | 507/269 |
| 4,010,071 A | 3/1977 | Colegrove | |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | |
| 4,265,673 A | 5/1981 | Pace et al. | |
| 4,299,825 A | 11/1981 | Lee | |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | 252/8.55 R |
| 4,632,876 A | 12/1986 | Laird et al. | |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,767,628 A * | 8/1988 | Hutchinson | 424/426 |
| 4,767,706 A | 8/1988 | Levesque | |
| 4,772,346 A | 9/1988 | Anderson et al. | 156/89.18 |
| 4,785,884 A | 11/1988 | Armbruster | 166/280 |
| 4,793,416 A | 12/1988 | Mitchell | 166/266 |
| 4,797,262 A | 1/1989 | Dewitz | 422/142 |

(Continued)

FOREIGN PATENT DOCUMENTS

| | | |
|---|---|---|
| EP | 0 510 762 A2 | 4/1992 |
| EP | 0 879 935 A2 | 11/1998 |

(Continued)

OTHER PUBLICATIONS

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemcial "Trigger" Useful for Oilfield Applications*, Society of Petroleum Engineers, Inc., SPE 92709, Feb. 4, 2005.
Skrabal et al., *The Hydrolysis Rate of Orthoformic Acid Ethyl Ether*, Chemical Institute of the University of Graz, pp. 1-38, Jan. 13, 1921.
Heller, et al., *Poly(ortho esters)—From Concept to Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).

(Continued)

*Primary Examiner* — Elena T Lightfoot
(74) *Attorney, Agent, or Firm* — Robert A. Kent; McDermott Will & Emery LLP

(57) ABSTRACT

The present invention relates to methods and compositions for treating subterranean formations, and more specifically, to improved methods and compositions for degrading filter cake deposited on a subterranean formation. One embodiment of the present invention provides a method of creating particulates coated with acid-releasing degradable material on-the-fly comprising the step of: combining an acid-releasing degradable material with a solvent or a plasticizer to create a coating solution; and, coating the coating solution onto a particulate on-the-fly to create coated particulates. Another embodiment of the present invention provides a gravel pack comprising gravel particles coated on-the-fly with an acid-releasing degradable material.

20 Claims, No Drawings

(56) References Cited

U.S. PATENT DOCUMENTS

| | | | |
|---|---|---|---|
| 4,809,783 A | 3/1989 | Hollenbeck et al. | 166/307 |
| 4,817,721 A | 4/1989 | Pober | 166/295 |
| 4,822,500 A | 4/1989 | Dobson, Jr. et al. | |
| 4,829,100 A * | 5/1989 | Murphey et al. | 523/131 |
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,863,980 A | 9/1989 | Cowan et al. | |
| 4,886,354 A | 12/1989 | Welch et al. | 356/70 |
| 4,894,231 A | 1/1990 | Moreau et al. | |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,192,615 A * | 3/1993 | McDougall et al. | 428/402.24 |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,251,697 A | 10/1993 | Shuler | |
| 5,295,542 A | 3/1994 | Cole et al. | 166/278 |
| 5,304,620 A | 4/1994 | Holtmyer et al. | |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,783,527 A | 7/1998 | Dobson, Jr. et al. | |
| 5,791,415 A | 8/1998 | Nguyen et al. | 166/280 |
| 5,799,734 A | 9/1998 | Norman et al. | |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,916,849 A | 6/1999 | House | |
| 5,924,488 A | 7/1999 | Nguyen et al. | 166/280 |
| 5,964,291 A | 10/1999 | Bourne et al. | 166/279 |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | |
| 6,172,011 B1 | 1/2001 | Card et al. | |
| 6,189,615 B1 | 2/2001 | Sydansk | 166/270 |
| 6,202,751 B1 | 3/2001 | Chatterji et al. | |
| 6,209,643 B1 * | 4/2001 | Nguyen et al. | 166/276 |
| 6,209,646 B1 | 4/2001 | Reddy et al. | |
| 6,214,773 B1 | 4/2001 | Harris et al. | |
| 6,242,390 B1 | 6/2001 | Mitchell et al. | 507/211 |
| 6,260,622 B1 | 7/2001 | Blok et al. | 166/305.1 |
| 6,277,408 B1 * | 8/2001 | Wellinghoff et al. | 424/473 |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | 166/280 |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | |
| 6,394,185 B1 | 5/2002 | Constien | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,458,867 B1 * | 10/2002 | Wang et al. | 523/105 |
| 6,485,947 B1 | 11/2002 | Rajgarhia et al. | |
| 6,488,763 B2 | 12/2002 | Brothers et al. | |
| 6,488,901 B1 | 12/2002 | Schmidt et al. | 423/148 |
| 6,494,263 B2 | 12/2002 | Todd | |
| 6,508,305 B1 | 1/2003 | Brannon et al. | |
| 6,509,301 B1 | 1/2003 | Vollmer et al. | |
| 6,527,051 B1 | 3/2003 | Reddy et al. | |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,599,863 B1 | 7/2003 | Palmer et al. | 507/219 |
| 6,667,279 B1 | 12/2003 | Hessert et al. | |
| 6,669,771 B2 * | 12/2003 | Tokiwa et al. | 106/162.7 |
| 6,681,856 B1 | 1/2004 | Chatterji et al. | |
| 6,686,328 B1 | 2/2004 | Binder | |
| 6,689,608 B1 * | 2/2004 | Mikos et al. | 435/395 |
| 6,691,780 B2 | 2/2004 | Nguyen et al. | |
| 6,702,023 B1 | 3/2004 | Harris et al. | |
| 6,710,019 B1 | 3/2004 | Sawdon et al. | 507/136 |
| 6,716,797 B2 | 4/2004 | Brookey | |
| 6,737,385 B2 | 5/2004 | Todd et al. | |
| 6,761,218 B2 | 7/2004 | Nguyen et al. | |
| 6,763,888 B1 | 7/2004 | Harris et al. | |
| 6,764,981 B1 | 7/2004 | Eoff et al. | |
| 6,793,018 B2 | 9/2004 | Dawson et al. | |
| 6,793,730 B2 | 9/2004 | Reddy et al. | |
| 6,806,235 B1 | 10/2004 | Mueller et al. | |
| 6,817,414 B2 | 11/2004 | Lee | |
| 6,818,594 B1 | 11/2004 | Freeman et al. | |
| 6,837,309 B2 | 1/2005 | Boney et al. | 166/280.2 |
| 6,883,608 B2 | 4/2005 | Parlar et al. | |

| | | |
|---|---|---|
| 6,896,058 B2 | 5/2005 | Munoz, Jr. et al. |
| 6,904,971 B2 | 6/2005 | Brothers et al. |
| 6,949,491 B2 | 9/2005 | Cooke, Jr. |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,801 B2 | 1/2006 | Dawson et al. |
| 6,987,083 B2 | 1/2006 | Phillippi et al. |
| 6,997,259 B2 | 2/2006 | Nguyen |
| 7,001,872 B2 | 2/2006 | Pyecroft et al. ............... 507/211 |
| 7,007,752 B2 | 3/2006 | Reddy et al. |
| 7,021,377 B2 | 4/2006 | Todd et al. |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,063,151 B2 | 6/2006 | Nguyen et al. ............ 166/280.2 |
| 7,066,258 B2 | 6/2006 | Justus et al. |
| 7,069,994 B2 | 7/2006 | Cooke, Jr. |
| 7,080,688 B2 * | 7/2006 | Todd et al. .................... 166/278 |
| 7,093,664 B2 | 8/2006 | Todd et al. |
| 7,096,947 B2 | 8/2006 | Todd et al. |
| 7,131,491 B2 | 11/2006 | Blauch et al. |
| 7,140,438 B2 | 11/2006 | Frost et al. .................... 166/278 |
| 7,151,077 B2 | 12/2006 | Prud'homme et al. |
| 7,156,174 B2 | 1/2007 | Roddy et al. |
| 7,165,617 B2 | 1/2007 | Lord et al. |
| 7,166,560 B2 * | 1/2007 | Still et al. ...................... 507/219 |
| 7,168,489 B2 | 1/2007 | Frost et al. .................... 166/278 |
| 7,172,022 B2 | 2/2007 | Reddy et al. |
| 7,178,596 B2 | 2/2007 | Blauch et al. ................. 166/280 |
| 7,195,068 B2 | 3/2007 | Todd |
| 7,204,312 B2 | 4/2007 | Roddy et al. |
| 7,219,731 B2 | 5/2007 | Sullivan et al. ............... 166/278 |
| 7,228,904 B2 | 6/2007 | Todd et al. |
| 7,261,156 B2 | 8/2007 | Nguyen et al. ................ 166/276 |
| 7,264,051 B2 | 9/2007 | Nguyen et al. ................ 166/276 |
| 7,267,170 B2 | 9/2007 | Mang et al. |
| 7,276,466 B2 | 10/2007 | Todd et al. .................... 507/260 |
| 7,299,876 B2 | 11/2007 | Lord et al. |
| 7,306,037 B2 | 12/2007 | Nguyen et al. ................ 166/295 |
| 7,353,876 B2 | 4/2008 | Savery et al. |
| 7,353,879 B2 | 4/2008 | Todd et al. |
| 7,448,450 B2 | 11/2008 | Luke et al. |
| 7,497,278 B2 | 3/2009 | Schriener et al. |
| 2001/0016562 A1 | 8/2001 | Muir et al. .................... 507/201 |
| 2002/0036088 A1 | 3/2002 | Todd ............................ 166/300 |
| 2002/0119169 A1 | 8/2002 | Angel et al. |
| 2002/0125012 A1 | 9/2002 | Dawson et al. ............... 166/300 |
| 2003/0054962 A1 | 3/2003 | England et al. |
| 2003/0060374 A1 * | 3/2003 | Cooke, Jr. ..................... 507/200 |
| 2003/0114314 A1 | 6/2003 | Ballard et al. ................. 507/200 |
| 2003/0114539 A1 | 6/2003 | Weaver et al. .................. 516/53 |
| 2003/0125215 A1 * | 7/2003 | Schwartz et al. ............. 507/121 |
| 2003/0130133 A1 | 7/2003 | Vallmer ........................ 507/100 |
| 2003/0147965 A1 | 8/2003 | Bassett et al. |
| 2003/0188766 A1 | 10/2003 | Banerjee et al. ................... 134/7 |
| 2003/0230407 A1 | 12/2003 | Vijn et al. |
| 2003/0234103 A1 | 12/2003 | Lee et al. ...................... 166/293 |
| 2003/0236171 A1 | 12/2003 | Nguyen et al. ................ 507/100 |
| 2004/0014606 A1 | 1/2004 | Parlar et al. |
| 2004/0014607 A1 | 1/2004 | Sinclair et al. ................ 507/200 |
| 2004/0040706 A1 | 3/2004 | Hossaini et al. .............. 166/278 |
| 2004/0055747 A1 | 3/2004 | Lee ............................... 166/278 |
| 2004/0070093 A1 | 4/2004 | Mathiowitz et al. |
| 2004/0094300 A1 | 5/2004 | Sullivan et al. ............ 166/308.1 |
| 2004/0099416 A1 | 5/2004 | Vijn et al. |
| 2004/0106525 A1 | 6/2004 | Willbert et al. ............... 507/200 |
| 2004/0138068 A1 | 7/2004 | Rimmer et al. ............... 507/100 |
| 2004/0152601 A1 | 8/2004 | Still et al. ...................... 507/100 |
| 2004/0152602 A1 | 8/2004 | Boles ............................ 507/100 |
| 2004/0162386 A1 | 8/2004 | Altes et al. |
| 2004/0170836 A1 | 9/2004 | Bond et al. |
| 2004/0175691 A1 * | 9/2004 | Brown et al. ..................... 435/4 |
| 2004/0214724 A1 | 10/2004 | Todd et al. |
| 2004/0216876 A1 | 11/2004 | Lee ............................ 166/280.1 |
| 2004/0221985 A1 | 11/2004 | Hill et al. ................. 166/250.01 |
| 2004/0231845 A1 | 11/2004 | Cooke, Jr. ..................... 166/279 |
| 2004/0261993 A1 | 12/2004 | Nguyen ........................ 166/276 |
| 2004/0261995 A1 | 12/2004 | Nguyen et al. ................ 166/279 |
| 2004/0261996 A1 | 12/2004 | Munoz, Jr. et al. ........... 166/279 |
| 2004/0261999 A1 | 12/2004 | Nguyen ........................ 166/292 |
| 2005/0006095 A1 | 1/2005 | Justus et al. ................... 166/295 |
| 2005/0028976 A1 | 2/2005 | Nguyen ........................ 166/276 |
| 2005/0034861 A1 | 2/2005 | Saini et al. |
| 2005/0034865 A1 | 2/2005 | Todd et al. .................... 166/304 |
| 2005/0059556 A1 | 3/2005 | Munoz, Jr. et al. |
| 2005/0059557 A1 | 3/2005 | Todd et al. |
| 2005/0059558 A1 | 3/2005 | Blauch et al. |
| 2005/0103496 A1 | 5/2005 | Todd et al. .................... 166/278 |
| 2005/0126785 A1 | 6/2005 | Todd et al. |
| 2005/0130848 A1 | 6/2005 | Todd et al. |
| 2005/0137094 A1 | 6/2005 | Weaver et al. ................ 507/209 |
| 2005/0183741 A1 | 8/2005 | Surjaatmadja et al. |
| 2005/0205266 A1 | 9/2005 | Todd et al. |
| 2005/0252659 A1 | 11/2005 | Sullivan et al. ............ 166/280.1 |
| 2005/0267565 A1 * | 12/2005 | Dave et al. .................... 623/1.15 |
| 2005/0272613 A1 | 12/2005 | Cooke, Jr. ..................... 507/219 |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. .................... 507/103 |
| 2006/0105918 A1 | 5/2006 | Munoz, Jr. et al. |
| 2006/0169182 A1 | 8/2006 | Todd et al. |
| 2006/0169450 A1 | 8/2006 | Mang et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini et al. |
| 2006/0185848 A1 | 8/2006 | Surjaatmadja et al. |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. ............. 166/300 |
| 2007/0235190 A1 | 10/2007 | Lord et al. |
| 2008/0070810 A1 | 3/2008 | Mang |

FOREIGN PATENT DOCUMENTS

| | | |
|---|---|---|
| EP | 0 879 935 A3 | 10/1999 |
| EP | 1267034 | 12/2002 |
| EP | 1 413 710 A1 | 4/2004 |
| JP | 2004181820 A | 7/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 94/08090 A1 | 4/1994 |
| WO | WO 95/09879 | 4/1995 |
| WO | WO 95/09879 A1 | 4/1995 |
| WO | WO 97/11845 | 4/1997 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 | 5/2004 |
| WO | WO 2004/038176 A1 | 5/2004 |
| WO | WO 2005/066451 | 7/2005 |
| WO | WO 2005/083029 | 9/2005 |

OTHER PUBLICATIONS

Ng, et al., *Development of a Poly(ortho ester) prototype With a Latent Acid in the Polymer Backbone for 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) for the Pulsed and Continuous Delivery of Peptides and Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight for Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Y. Chiang et al.: "Hydrolysis of Ortho Esters: Further Investigation of the Factors which Control the Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence for a Three-Stage Reaction Mechanism," Engineering Information Inc., NY, NY, vol. 101, No. 10 (XP-002322843), May 9, 1979.

U.S. Appl. No. 10/655,883, filed Sep. 5, 2003, Nguyen.

U.S. Appl. No. 10/650,101, filed Aug. 26, 2003, Todd, et al.

U.S. Appl. No. 10/661,173, filed Sep. 11, 2003, Todd, et al.

U.S. Appl. No. 10/664,126, field Sep. 17, 2003, Todd, et al.

U.S. Appl. No. 10/736,152, filed Dec. 15, 2003, Todd.

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Notice of Allowance from U.S. Appl. No. 10/641,242, May 15, 2006.

Office Action from U.S. Appl. No. 10/641,242, Nov. 27, 2005.

Office Action from U.S. Appl. No. 10/641,242, Jun. 9, 2005.

Foreign Search Report from a Related Application, Jul. 5, 2005.

Foreign Search Report from a Related Application, Apr. 13, 2005.

U.S. Appl. No. 11/047,876, filed Jan. 31, 2005, Mang, et al.

U.S. Appl. No. 11/049,600, filed Feb. 2, 2005, Mang, et al.

Kiyoshi Matsuyama et al, Environmentally benign formation of polymeric microspheres by rapid expansion of supercriticalcarbon dioxide solution with a nonsolvent, Environ Sci Techno 12001, 35, 4149-4155.

Notice of Allowance dated May 15, 2006 from U.S. Appl. No. 10/641,242.

Office Action dated Nov. 17, 2005 from U.S. Appl. No. 10/641,242.

Office Action dated Jun. 9, 2005 from U.S. Appl. No. 10/641,242.

NatureWorks Product Bulletin entitled NatureWorks PLA Polymer 3001D, Injection Molding Process Guide, 2005.

NatureWorks Product Bulletin entitled NatureWorks PLA Polymer 4060D, For Heat Seal Layer in Coextruded Oriented Films, 2005.

NatureWorks article entitled NatureWorks, Crystallizing and Drying of PLA, 2005.

* cited by examiner

ON-THE FLY COATING OF ACID-RELEASING DEGRADABLE MATERIAL ONTO A PARTICULATE

CROSS-REFERENCE TO RELATED APPLICATIONS

This application is a continuation-in-part of U.S. application Ser. No. 10/641,242, which was filed on Aug. 14, 2003 now U.S. Pat. No. 7,080,688.

BACKGROUND OF THE INVENTION

The present invention relates to methods and compositions for treating subterranean formations, and more specifically, to improved methods and compositions for degrading filter cake deposited in a subterranean formation.

Filter cake, the residue deposited on a permeable medium when servicing fluids contact the medium under a pressure, is formed in a variety of subterranean operations such as drilling, fracturing, and gravel packing. A filter cake is often desirable, at least temporarily, in subterranean operations as it may act to stem the flow of a servicing fluid from its desired location, to the surrounding subterranean formation. For instance, where the servicing fluid is a drilling fluid, a filter cake formed on the wall of the well bore may act to keep the drilling fluid in its desired location, in the annulus between the well bore and the drill pipe, rather than allowing the drilling fluid to leach off into the surrounding formation. Loss of drilling, fracturing, gravel transport and other servicing fluids into the formation represents an increased expense and, if too much fluid is lost, the attendant increase in damage to the producing zones in the formation. Moreover, the presence of a filter cake may add strength and stability to the formation surfaces on which the filter cake forms, as in the case of soft sandstone formations.

Filter cakes may be formed during drilling and fracturing operations. Once a well bore is established, the producing zones along the well bore may be treated to increase their production rate. One such production stimulation treatment involves hydraulically fracturing the formation with a viscous treating fluid to create one or more cracks or "fractures." As a fracture is created, a portion of the fluid contained in the viscous fracturing fluid leaks off into the formation and creates a filter cake comprising deposited viscosifying agent and fluid loss control agent on the walls of the fracture and the formation. The filter cake acts as a physical barrier to liquid travel that, as described above, helps reduce fluid loss into the producing zone. The filter cake may also present a barrier to flow of liquid from the zone, thus, after the fracturing operation has been completed, the filter cake generally needs to be removed to maximize oil and/or gas production.

Sand control operations, such as gravel packing, are also common after a well bore is drilled. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Often, gravel packs are placed along a well bore having a filter cake on its walls.

While filter cakes may be beneficial, it is generally necessary to remove filter cakes from producing zones before the well is placed onto production. One known method for the removal of filter cakes from producing formations involves including an acid-soluble particulate solid bridging agent for bridging over the formation pores in the drilling, fracturing, gravel transport or other servicing fluid that forms the filter cake. Such an acid-soluble filter cake could then be removed by placing a strongly acidic acid solution in contact with the filter cake and allowing that solution to remain in contact for a period of time sufficient to dissolve the filter cake.

One consideration in removing a deposited filter cake from a subterranean well bore formation involves the timing of such removal. For instance, in situations where sand control of the formation is a concern, a filter cake offers some degree of control over unconsolidated particulates in the subterranean formation while placing the gravel pack. For example, if the filter cake is removed prior to gravel packing, the unconsolidated particulates are not controlled and well bore stability problems may arise causing the collapse of the bore hole and preventing the installation of a gravel pack. While installing the screen and placing the gravel before removing the filter cake helps control unconsolidated particulates and maintain bore hole stability, it also makes the filter cake itself more difficult to remove. This is because the screen and gravel represents a physical barrier between the filter cake on walls of the well bore and the acidic fluid used to remove the filer cake.

One conventional method that attempts to overcome that problem involves placing a breaker (e.g., an oxidizer, ester, enzyme, or the like) in the fracturing, transport or other servicing fluid that creates and/or treats the filter cake in hopes that the breaker will permeate the filter cake and break it down. However, because the breaker is dissolved in the servicing fluid and not all of the servicing fluid remains in the subterranean formation inter alia, while circulating a gravel pack, much of the breaker that is used gets circulated out of the well bore and does not interact with the filter cake as desired.

More recently, it has been found that acid-releasing degradable material may be coated onto a particulate and act at a delayed rate to produce acid such that the particulate may be placed in the subterranean formation adjacent to the filter cake before a substantial amount of acid is released. In such methods known in the art, the acid-releasing degradable material had to be coated onto the particulate in a controlled environment off-site from the well head. The material then had to be coated onto various types and sizes of gravel/proppant, stored, and transported before it could be used in a subterranean formation.

SUMMARY OF THE INVENTION

The present invention relates to methods and compositions for treating subterranean formations, and more specifically, to improved methods and compositions for degrading filter cake deposited on a subterranean formation.

One embodiment of the present invention provides a method of creating particulates coated with acid-releasing degradable material on-the-fly comprising the step of: combining an acid-releasing degradable material with a solvent or a plasticizer to create a coating solution; and, coating the coating solution onto a particulate on-the-fly to create coated particulates.

Another embodiment of the present invention provides a method of degrading filter cake in a subterranean formation comprising the steps of: combining an acid-releasing degradable material with a solvent or a plasticizer to create a coating solution; coating the coating solution onto a particulate on-the-fly to create coated particulates; placing the coated particulates into a subterranean formation so that they form a pack substantially adjacent to a filter cake; allowing the low molecular weight acid-releasing degradable material to produce acid; and allowing the acid to contact and degrade a portion of the filter cake.

Still another embodiment of the present invention provides a gravel pack comprising gravel particles coated on-the-fly with an acid-releasing degradable material.

The objects, features, and advantages of the present invention will be readily apparent to those skilled in the art upon a reading of the description of the preferred embodiments that follows.

DESCRIPTION OF PREFERRED EMBODIMENTS

The present invention relates to methods and compositions for treating subterranean formations, and more specifically, to improved methods and compositions for degrading filter cake deposited on a subterranean formation.

Certain embodiments of the compositions of the present invention comprise particulates coated on-the-fly with an acid-releasing degradable material that releases acid over time. The released acid may be used to degrade an acid-degradable filter cake substantially adjacent to the coated particulates. In some embodiments the acid-releasing degradable material used to coat the particulates acts at a delayed rate to produce acid such that the particles may be placed in the subterranean formation adjacent to the filter cake before a substantial amount of acid is released. The compositions and methods of the present invention are suitable for use in removing any filter cake that degrades in the presence of an acid.

Any particulate material suitable for use in conjunction with subterranean applications is suitable for use as the particulate in the compositions and methods of the present invention. Natural sand, quartz sand, particulate garnet, glass, ground walnut hulls, nylon pellets, bauxite, ceramics, polymeric materials, or the like are all suitable. Suitable sizes range from 4 to 100 U.S. mesh, in certain preferred embodiments the sizes range from 10 to 70 US mesh. The particulate material of the present invention may be used as gravel particles used in sand control operations, as proppant particles used in fracturing operations, or as any other particulate employed in subterranean operations that may be placed substantially adjacent to a filter cake.

Acid-releasing degradable materials that may be used in conjunction with the present invention are those materials that can be coated onto a particulate on-the-fly and that are substantially water insoluble such that they degrade over time, rather than instantaneously, to produce an acid.

Moreover, in order for an acid-releasing degradable material to be suitable for on-the-fly coating onto a particulate, it must be in a substantially liquid, flowable form. Solvents can be used for this purpose. Such suitable solvents include, but are not limited to, acetone, propylene carbonate, di(propylene glycol) methyl ether, di(propylene glycol) propyl ether, di(propylene glycol) butyl ether, di(propylene glycol) methyl ether acetate, isopropyl alcohol, chloroform, dichloromethane, trichloromethane, 1,2-dichlorobenzene, tetrahydrofuran, benzene, acetonitrile, dioxane, dimethylformamide, toluene, ethyl acetate, isoamyl alcohol, N-methylpyrrolidone, xylenes, dichloroacetic acid, m-cresol, hexafluoroisopropanol, diphenyl ether, acetonitrile, methanol, ethyl benzene, naphthalene, naphtha and combinations thereof. As an alternative to a solvent, a plasticizer also may be used to make the polymer more flowable for the coating process. Examples of plasticizers useful for this purpose include, but are not limited to, polyethylene glycol; polyethylene oxide; oligomeric lactic acid; citrate esters (such as tributyl citrate oligomers, triethyl citrate, acetyltributyl citrate, acetyltriethyl citrate, 25% by weight after the phase separate); glucose monoesters; partially esterified fatty acid esters; PEG monolaurate; triacetin; poly(e-caprolactone); poly(hydroxybutyrate); glycerin-1-benzoate-2,3-dilaurate; glycerin-2-benzoate-1,3-dilaurate; starch; bis(butyl diethylene glycol)adipate; ethylphthalylethyl glycolate; glycerine diacetate monocaprylate; diacetyl monoacyl glycerol; polypropylene glycol (and epoxy derivatives thereof); poly (propylene glycol)dibenzoate, dipropylene glycol dibenzoate; glycerol; ethyl phthalyl ethyl glycolate; poly(ethylene adipate)distearate; di-iso-butyl adipate; and combinations thereof.

Generally, suitable acid-releasing degradable materials include polyesters; poly(orthoesters); aliphatic polyesters; lactides, poly(lactides); glycolides; poly(glycolides); poly($\epsilon$-caprolactone); poly(hydroxybutyrate); substantially water insoluble anhydrides; poly(anhydrides); poly(amino acids); and mixtures and copolymers of the same. The acid-releasing degradable material chosen must be substantially soluble in the chosen solvent. While no particular molecular weight is required, lower molecular weight materials may be more easily soluble. By way of example, polylactides having a molecular weight of less than about 3,000 are generally soluble in propylene carbonate while polylactides having a molecular weight of 50,000 generally are not. Copolymerization may also be used to facilitate solubility in a suitable solvent. By way of example, copolymers of lactide and glycolide will be soluble in di(proplylene glycol) methyl ether at molecular weights where a polylacide material of the same molecular weight would not be soluble. Amorphous polymers are generally more soluble in solvents and this property can be considered in choosing a material for coating. It is within the ability of one skilled in the art, with the benefit of this disclosure, to select an acid-releasing degradable material suitable for use in the present invention.

Polymers suitable for use as an acid-releasing degradable material of the present invention may be considered degradable if the degradation is due, inter alia, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Blends of certain acid-releasing degradable materials may also be suitable. One example of a suitable blend of materials includes a blend of a poly(lactic acid) and lactide. Other materials that undergo degradation and produce acid may also be suitable, if the products of the degradation do not undesirably interfere with either the subterranean treatment being performed or the subterranean formation.

In choosing the appropriate acid-releasing degradable material, one should consider the degradation products that will result. Also, these degradation products should not adversely affect other operations or components. The conditions of the well, e.g., well bore temperature and environmental factors, must also be considered when choosing an acid-releasing degradable material. For instance, polyesters have been found to be suitable for well bore temperatures in the range of 60° F. to 400° F. Generally, smaller molecule acid-releasing degradable materials are suitable for use in lower temperature application and larger molecule acid-releasing degradable materials are suitable for use in higher-temperature applications. By way of example, lactide is suitable for temperatures below 120 F and 3,000 molecular weight polylactide for temperatures above 180 F. Copolymers of lactide and glycolide are suitable for use in the 120 F to 180 F. It is within the ability of one skilled in the art, with the benefit of this disclosure, to select a suitable acid-releasing degradable material.

When used in the present invention, a preferable result is achieved if the degradable material degrades slowly over time as opposed to instantaneously. Even more preferable results have been obtained when the degradable material does not substantially degrade until after the subterranean treatment, such as a gravel packing or fracturing operation, has been substantially completed.

The acid-releasing degradable material of the present invention may be coated onto particulate material by any means known in the art. In one embodiment, the particles may be coated with the acid-releasing degradable material "on-the-fly." The term "on-the-fly" is used herein to mean that one flowing stream is continuously introduced into another flowing stream so that the streams are combined and mixed while continuing to flow as a single stream as part of the on-going treatment at the job site. Such mixing can also be described as "real-time" mixing. One such on-the-fly mixing method would involve continuously conveying the particles and the acid-releasing degradable material to a mixing vessel. Once inside the mixing vessel, the particles would be coated with the acid-releasing degradable material and continuously removed from the mixing vessel. In that situation, a sand screw could be used both to aid in mixing the particulates, be they gravel, proppant, or some other particulate, with the acid-releasing degradable material and to remove the acid-releasing degradable material-coated particles from the mixing tank. As is well understood by those skilled in the art, batch or partial batch mixing may also be used to accomplish such coating.

In some embodiments of the present invention the particle material, such as gravel in a gravel packing operation or proppant in a fracturing operation, is coated with from about 0.1% to about 20% acid-releasing degradable material by weight of the gravel particles, more preferably from about 0.5% to about 10% acid-releasing degradable material by weight of the gravel particles and most preferably from about 1% to about 8% acid-releasing degradable material by weight of the particulate material. In some embodiments of the present invention, all of the particles used in the subterranean operation are coated with an acid-releasing degradable material of the present invention. In other embodiments, only a portion of the particles is coated. Where the percentage of particles coated is less than 100%, it may be desirable to coat a higher percentage of the acid-releasing degradable material on the coated particles. It is within the ability of one skilled in the art to determine the amount of acid-releasing degradable material that will be necessary to sufficiently degrade the filter cake and to coat enough particles with enough acid-releasing degradable material to achieve that goal.

Where the coated particles of the present invention are used in a sand control operation such as gravel packing, the gravel pack may be formed using any technique known in the art. In one technique, gravel particles at least partially coated with an acid-releasing material are slurried into a delivery fluid and pumped into the well bore having a filter cake deposited thereon and substantially adjacent to the zone of the subterranean formation that has been fitted with a gravel pack screen. The gravel material is separated from the slurry as the delivery fluid is forced into the well bore and through the screen. The gravel particles are not able to flow through the mesh of the screen and are left behind, thus forming a gravel pack. In a gravel pack formed from such coated particles, the acid-releasing degradable material substantially degrades the adjacent filter cake.

Similarly, where the coated particles of the present invention are used in a fracturing operation, the proppant pack formed inside the fracture with the coated particles of the present invention may be formed using any technique known in the art. In one technique, proppant particles at least partially coated with an acid-releasing material are slurried into a fracturing fluid and pumped into a fractured subterranean formation. The proppant particles are then placed in the fracture and form a proppant pact substantially adjacent to walls of the fracture. Once the proppant pack is substantially formed, the acid-releasing degradable material produces a sufficient amount of acid at least to partially degrade the filter cake on the walls of the fracture.

To facilitate a better understanding of the present invention, the following example of a preferred embodiment is given. In no way should the following example be read to limit the scope of the invention.

EXAMPLE

A 6100 molecular weight copolymer of 50% lactic acid and 50% glycolic acid was synthesized. The copolymer was then dissolved in propylene carbonate to a 50/50% concentration of polymer to solvent. The polymer/solvent was coated onto 20/40 Carbolite® proppant at a 4% concentration by weight of the proppant. A filter cake was deposited on a 35 micron Aloxite core in a Fann HPHT Filtration Cell from a drill-in fluid formulated using a 10% sodium chloride base fluid with 0.2% xanthan, 1.9% starch, 6.7% 5 micron median diameter calcium carbonate, 16.7% 25 micron median diameter calcium carbonate 0.025% sodium hydroxide. Once the filter cake was formed, with 500 psi differential pressure at 150 F for 60 minutes, the excess drill-in fluid was removed from the test chamber and replaced with 141 grams of the coated proppant and 64 mL of 10% sodium chloride solution. The cell was heated to 160 F with 50 psi differential pressure and the filtrate rate was monitored. The filtrate rate averaged around 2 mL/hr for the first 9 hours indicating the filter cake was still intact. At around 9 hours, the filtrate rate began to increase and was around 300 mL/hr within about 5 minutes of the point of the increase. The increase flow rate is an indication of filter cake degradation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of degrading filter cake in a subterranean formation comprising the steps of:
combining an acid-releasing degradable material with a solvent or a plasticizer to create a coating solution, wherein the acid-releasing degradable material comprises at least one acid-releasing degradable material selected from the group consisting of: poly(orthoester); a lactide, a poly(lactide); a glycolide; a poly(glycolide); a poly($\epsilon$-caprolactone); a poly(hydroxybutyrate); a substantially water insoluble anhydride; a poly(anhydride); a poly(amino acid); a copolymer of two or more of the above-listed compounds; and any combination thereof;
coating the coating solution onto a particulate on-the-fly to create coated particulates, wherein the acid-releasing degradable material comprises a material that is substantially water insoluble;
placing the coated particulates into a subterranean formation so that at least a portion of the coated particulates become incorporated in a pack substantially adjacent to a filter cake;
allowing the acid-releasing degradable material to produce acid; and
allowing the acid to contact and degrade a portion of the filter cake.

2. The method of claim 1 wherein the filter cake comprises a filter cake on the walls of a well bore or a filter cake on the walls of a fracture.

3. The method of claim 1 wherein the particulates are coated with from about 0.1% to about 20% acid-releasing degradable material by weight of the particulates.

4. The method of claim 1 wherein acid-releasing degradable material comprises a material that degrades over time in an aqueous environment.

5. The method of claim 1 wherein the solvent comprises at least one solvent selected from the group consisting of: acetone; propylene carbonate; di(propylene glycol) methyl ether; di(propylene glycol) propyl ether; di(propylene glycol) butyl ether; di(propylene glycol) methyl ether acetate; isopropyl alcohol; chloroform; dichloromethane; trichloromethane; 1,2-dichlorobenzene; tetrahydrofuran; benzene; acetonitrile; dioxane; dimethylformamide; toluene; ethyl acetate; isoamyl alcohol; N-methylpyrrolidone; xylene; dichloroacetic acid; m-cresol; hexafluoroisopropanol; diphenyl ether; acetonitrile; methanol; ethyl benzene; naphthalene; naphtha; and any combination thereof.

6. The method of claim 1 wherein the plasticizer comprises at least one plasticizer selected from the group consisting of: polyethylene glycol; polyethylene oxide; oligomeric lactic acid; a citrate ester; a glucose monoester; a partially esterified fatty acid ester; PEG monolaurate; triacetin; poly($\epsilon$-caprolactone); poly(hydroxybutyrate); glycerin-1-benzoate-2,3-dilaurate; glycerin-2-benzoate-1,3-dilaurate; a starch; bis(butyl diethylene glycol)adipate; ethylphthalylethyl glycolate; glycerine diacetate monocaprylate; diacetyl monoacyl glycerol; polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and any combination thereof.

7. The method of claim 1 wherein the acid-releasing degradable material comprises a poly(orthoester).

8. A method of using a portion of a gravel pack to degrade a portion of a filter cake comprising the steps of:
combining an acid-releasing degradable material with a solvent or a plasticizer to create a coating solution; wherein the acid-releasing degradable material comprises at least one acid-releasing degradable material selected from the group consisting of: poly(orthoester); a poly($\epsilon$-caprolactone); a poly(hydroxybutyrate); a substantially water insoluble anhydride; a poly(anhydride); a poly(amino acid); a copolymer of two or more of the above-listed compounds; and any combination thereof;
coating the coating solution onto gravel on-the-fly to create coated gravel, wherein the acid-releasing degradable material comprises a material that is substantially water insoluble;
introducing the coated gravel to a well bore having a filter cake so that at least a portion of the coated gravel is incorporated in a gravel pack substantially adjacent to the filter cake;
allowing the acid-releasing degradable material to produce acid; and,
allowing the acid to contact and degrade a portion of the filter cake.

9. The method of claim 8 wherein the gravel pack composition comprises from about 0.1% to about 20% acid-releasing degradable material by weight of the gravel particles.

10. The method of claim 8 wherein the acid-releasing degradable material comprises a material that it degrades over time.

11. The method of claim 8 wherein the solvent comprises at least one solvent selected from the group consisting of: acetone; propylene carbonate; di(propylene glycol) methyl ether; di(propylene glycol) propyl ether; di(propylene glycol) butyl ether; di(propylene glycol) methyl ether acetate; isopropyl alcohol; chloroform; dichloromethane; trichloromethane; 1,2-dichlorobenzene; tetrahydrofuran; benzene; acetonitrile; dioxane; dimethylformamide; toluene; ethyl acetate; isoamyl alcohol; N-methylpyrrolidone; xylene; dichloroacetic acid; m-cresol; hexafluoroisopropanol; diphenyl ether; acetonitrile; methanol; ethyl benzene; naphthalene; naphtha; and any combination thereof.

12. The method of claim 8 wherein the plasticizer comprises at least one plasticizer selected from the group consisting of: polyethylene glycol; polyethylene oxide; oligomeric lactic acid; a citrate ester; a glucose monoester; a partially esterified fatty acid ester; PEG monolaurate; triacetin; poly($\epsilon$-caprolactone); poly(hydroxybutyrate); glycerin-1-benzoate-2,3-dilaurate; glycerin-2-benzoate-1,3-dilaurate; a starch; bis(butyl diethylene glycol)adipate; ethylphthalylethyl glycolate; glycerine diacetate monocaprylate; diacetyl monoacyl glycerol; polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and any combination thereof.

13. The method of claim 8 wherein the acid-releasing degradable material comprises a poly(orthoester).

14. A method of degrading filter cake in a subterranean formation comprising the steps of:
combining an acid-releasing degradable material with a plasticizer to create a coating solution, with the proviso that the plasticizer does not comprise a starch;
coating the coating solution onto a particulate on-the-fly to create coated particulates, wherein the acid-releasing degradable material comprises a material that is substantially water insoluble;
placing the coated particulates into a subterranean formation so that at least a portion of the coated particulates become incorporated in a pack substantially adjacent to a filter cake;
allowing the acid-releasing degradable material to produce acid; and allowing the acid to contact and degrade a portion of the filter cake.

15. The method of claim 14 wherein the filter cake comprises a filter cake on the walls of a well bore or a filter cake on the walls of a fracture.

16. The method of claim 14 wherein the particulates are coated with from about 0.1% to about 20% acid-releasing degradable material by weight of the particulates.

17. The method of claim 14 wherein acid-releasing degradable material comprises a material that degrades over time in an aqueous environment.

18. The method of claim 14 wherein the acid-releasing degradable material comprises at least one acid-releasing degradable material selected from the group consisting of: a polyester, a poly(orthoester); a lactide, a poly(lactide); a glycolide; a poly(glycolide); a poly(ε-caprolactone); a poly(hydroxybutyrate); a substantially water insoluble anhydride; a poly(anhydride); a poly(amino acid); a mixture of one of the above-listed compounds; a copolymer of two or more of the above-listed compounds; and any combination thereof.

19. The method of claim 14 wherein the plasticizer comprises at least one plasticizer selected from the group consisting of: polyethylene glycol; polyethylene oxide; oligomeric lactic acid; a citrate ester; a glucose monoester; a partially esterified fatty acid ester; PEG monolaurate; triacetin; poly (ε-caprolactone); poly(hydroxybutyrate); glycerin-1-benzoate-2,3-dilaurate; glycerin-2-benzoate-1,3-dilaurate; a starch; bis(butyl diethylene glycol)adipate; ethylphthalylethyl glycolate; glycerine diacetate monocaprylate; diacetyl monoacyl glycerol; polypropylene glycol; poly(propylene glycol)dibenzoate, dipropylene glycol dibenzoate; glycerol; ethyl phthalyl ethyl glycolate; poly(ethylene adipate)distearate; di-iso-butyl adipate; and any combination thereof.

20. The method of claim 14 wherein the acid-releasing degradable material comprises a poly(orthoester).

\* \* \* \* \*